US011742549B2

(12) United States Patent
Chae et al.

(10) Patent No.: US 11,742,549 B2
(45) Date of Patent: Aug. 29, 2023

(54) SEPARATOR INCLUDING COATING LAYER OF LITHIUM-CONTAINING COMPOSITE, LITHIUM SECONDARY BATTERY INCLUDING THE SAME, AND METHOD FOR MANUFACTURING THE SECONDARY BATTERY

(71) Applicant: LG CHEM, LTD., Seoul (KR)

(72) Inventors: Oh-Byong Chae, Daejeon (KR); Sang-Wook Woo, Daejeon (KR); Je-Young Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 298 days.

(21) Appl. No.: 16/641,750

(22) PCT Filed: Mar. 20, 2019

(86) PCT No.: PCT/KR2019/003270
§ 371 (c)(1),
(2) Date: Feb. 25, 2020

(87) PCT Pub. No.: WO2019/182364
PCT Pub. Date: Sep. 26, 2019

(65) Prior Publication Data
US 2020/0266413 A1 Aug. 20, 2020

(30) Foreign Application Priority Data
Mar. 20, 2018 (KR) .......................... 10-2018-0032220

(51) Int. Cl.
*H01M 50/46* (2021.01)
*H01M 4/1391* (2010.01)
*H01M 4/1393* (2010.01)
*H01M 4/1395* (2010.01)
*H01M 4/36* (2006.01)
*H01M 4/525* (2010.01)
*H01M 4/62* (2006.01)
*H01M 10/0525* (2010.01)
*H01M 10/0569* (2010.01)
*H01M 50/449* (2021.01)
*H01M 50/403* (2021.01)
*H01M 4/02* (2006.01)

(52) U.S. Cl.
CPC ......... *H01M 50/46* (2021.01); *H01M 4/1391* (2013.01); *H01M 4/1393* (2013.01); *H01M 4/1395* (2013.01); *H01M 4/366* (2013.01); *H01M 4/525* (2013.01); *H01M 4/621* (2013.01); *H01M 10/0525* (2013.01); *H01M 10/0569* (2013.01); *H01M 50/403* (2021.01); *H01M 50/449* (2021.01); *H01M 2004/021* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2008/0057385 A1 | 3/2008 | Aramata et al. | |
| 2009/0070988 A1 | 3/2009 | Honda et al. | |
| 2012/0052192 A1 | 3/2012 | Aramata et al. | |
| 2014/0370358 A1 | 12/2014 | Hong et al. | |
| 2015/0228978 A1 | 8/2015 | Gadkaree et al. | |
| 2016/0156065 A1 | 6/2016 | Visco et al. | |
| 2017/0331147 A1 | 11/2017 | Woehrle et al. | |
| 2019/0088922 A1* | 3/2019 | Zhamu | C01B 33/00 |
| 2019/0115617 A1* | 4/2019 | Pan | H01M 4/366 |

FOREIGN PATENT DOCUMENTS

| | | |
|---|---|---|
| CN | 106129315 A | 11/2016 |
| CN | 106207049 A | 12/2016 |
| CN | 106876633 A | 6/2017 |
| CN | 106910860 A | 6/2017 |
| CN | 107591511 A | 1/2018 |
| JP | 2006-324020 A | 11/2006 |
| JP | 5207883 B2 | 6/2013 |
| JP | 5256660 B2 | 8/2013 |
| JP | 6005757 B2 | 10/2016 |

(Continued)

OTHER PUBLICATIONS

Machine translation of KR 10-2008-0106718, published on Dec. 9, 2008 (Year: 2008).*
International Search Report (PCT/ISA/210) issued in PCT/KR2019/003270, dated Jul. 3, 2019.
Zhao et al., "Dry-air-stable lithium silicide-lithium oxide core-shell nanoparticles as high-capacity prelithiation reagents", Nature Communications, 2014, pp. 1-8.
Extended European Search Report, dated Nov. 23, 2020, for corresponding European Application No. 19771302.7.

*Primary Examiner* — Anca Eoff
(74) *Attorney, Agent, or Firm* — Birch, Stewart, Kolasch & Birch, LLP

(57) ABSTRACT

A separator including: a porous polymer substrate having a plurality of pores; and a coating layer formed on at least one surface of the porous polymer substrate, and including a plurality of lithium-containing composite particles and a binder positioned on the whole or a part of the surface of the lithium-containing composite particles to connect and fix the lithium-containing composite particles with each other, wherein the lithium-containing composite particles includes a lithiated compound and a passivation film formed on the surface of the lithiated compound, and the passivation film includes a solid electrolyte interface (SEI). A lithium secondary battery including the separator and a method for manufacturing the lithium secondary battery are also provided.

15 Claims, 3 Drawing Sheets

(56) References Cited

FOREIGN PATENT DOCUMENTS

| | | | |
|---|---|---|---|
| KR | 10-2008-0020530 | A | 3/2008 |
| KR | 10-2008-010718 | * | 12/2008 |
| KR | 10-1536560 | B1 | 7/2015 |
| KR | 10-2016-0121547 | A | 10/2016 |
| KR | 10-2017-0067326 | A | 6/2017 |
| KR | 10-2017-0104461 | A | 9/2017 |
| KR | 10-2017-0106999 | A | 9/2017 |

* cited by examiner

SEPARATOR INCLUDING COATING LAYER OF LITHIUM-CONTAINING COMPOSITE, LITHIUM SECONDARY BATTERY INCLUDING THE SAME, AND METHOD FOR MANUFACTURING THE SECONDARY BATTERY

CROSS-REFERENCE TO RELATED APPLICATIONS

The present application is a National Stage entry under 37 C.F.R. 371 of International Application No. PCT/KR2019/003270 filed on Mar. 20, 2019, which claims priority to Korean Patent Application No. 10-2018-0032220 filed in Korea on Mar. 20, 2018, the entire contents of all of which are expressly incorporated by reference into the present application.

TECHNICAL FIELD

The present disclosure relates to a separator including a coating layer of lithium-containing composite. More particularly, the present disclosure relates to a separator including a coating layer of lithium-containing composite capable of supplementing the irreversible capacity of a negative electrode, a lithium secondary battery including the same, and a method for manufacturing the secondary battery.

BACKGROUND ART

As technological development and demand for mobile instruments have been increased, rechargeable secondary batteries have been increasingly in demand as energy sources. Among such secondary batteries, lithium secondary batteries having high energy density and voltage, long cycle life and a low discharge rate have been commercialized and used widely.

A lithium secondary battery includes a positive electrode, a negative electrode, a separator interposed between the positive electrode and negative electrode to isolate them from each other, and an electrolyte communicating electrochemically with the positive electrode and negative electrode.

Such a lithium secondary battery is generally obtained by using a lithium-intercalated compound, such as $LiCoO_2$ or $LiMn_2O_4$ for the positive electrode, and a non-lithium intercalated compound, such as a carbonaceous or Si-based material for the negative electrode. During charge, the lithium ions intercalated to the positive electrode move to the negative electrode through the electrolyte. During discharge, the lithium ions move back to the positive electrode from the negative electrode. During charge, lithium moving from the positive electrode to the negative electrode reacts with the electrolyte to form a kind of passivation film, solid electrolyte interface (SEI), on the surface of the negative electrode. The SEI inhibits transport of electrons required for the reaction of the negative electrode with the electrolyte to prevent decomposition of the electrolyte, thereby stabilizing the structure of the negative electrode. On the other hand, formation of SEI is irreversible to cause consumption of lithium ions. In other words, lithium consumed by the formation of SEI cannot be returned to the positive electrode during the subsequent discharge process, resulting in a drop in battery capacity. This is called irreversible capacity. In addition, since the charge/discharge efficiency of the positive electrode and negative electrode of a secondary battery is not perfectly 100%, consumption of lithium ions is generated, as cycles proceed, to cause a drop in electrode capacity, resulting in degradation of cycle life. Particularly, when a Si-based material is used for the negative electrode for the purpose of high capacity, the initial irreversible capacity is high and the initial efficiency is low due to depletion of lithium.

Therefore, there has been an attempt to carry out pre-lithiation to reduce the initial irreversibility of a negative electrode. In other words, before manufacturing a battery, irreversible reaction of a negative electrode is carried out preliminarily or some lithium is intercalated to the negative electrode in advance to ensure initial reversibility in order to improve capacity and electrochemical characteristics of a battery. When lithium metal is used directly for such pre-lithiation, lithium itself easily reacts with oxygen, nitrogen and carbon dioxide, since it is unstable in the air. Thus, it is difficult to handle lithium and there is a high risk of fire and explosion.

DISCLOSURE

Technical Problem

The present disclosure is designed to solve the problems of the related art, and therefore the present disclosure is directed to providing a separator which supplements irreversible capacity of a negative electrode more efficiently to improve initial efficiency and life characteristics, and a lithium secondary battery including the same.

The present disclosure is also directed to providing a method for manufacturing the lithium secondary battery.

Technical Solution

According to an embodiment of the present disclosure, there is provided a separator including: a porous polymer substrate having a plurality of pores; and a coating layer formed on at least one surface of the porous polymer substrate, wherein the coating layer comprises a plurality of lithium-containing composite particles and a binder positioned on the whole or a part of the surface of the lithium-containing composite particles to connect and fix the lithium-containing composite particles with each other, wherein the lithium-containing composite particles includes a lithiated compound and a passivation film formed on the surface of the lithiated compound, and the passivation film comprises a solid electrolyte interface (SEI).

According to the second embodiment of the present disclosure, there is provided the separator as defined in the first embodiment, wherein the lithiated compound includes one or more selected from the group consisting of lithium silicide ($Li_xSi$, $0<x<4.4$), $Li_xSn$ ($0<x<4.4$), $Li_xGe$ ($0<x<4.4$), $Li_xAl$ ($0<x<3$), $Li_xSb$ ($0<x<3$), $Li_xZn$ ($0<x<1$), Co—$Li_2O$, Ni—$Li_2O$, Fe—$Li_2O$, $Li_xC$ ($0<x<0.17$), $Li_{4+x}Ti_5O_{12}$ ($0<x<3$), $Li_xMoO_2$ ($0<x<4$), $Li_xTiO_2$ ($0<x<3$), and $Li_xV_2O_5$ ($0<x<5$).

According to the third embodiment of the present disclosure, there is provided the separator as defined in the first or the second embodiment, wherein the lithiated compound is obtained by intercalation of lithium ions a lithium-intercalatable material, and the lithium-intercalatable material includes one or more selected from the group consisting of: one or more metal (metalloid) or metal oxide of Si; Sn; Al; Sb or Zn; one or more metal oxide of $Co_xO_y$ ($1≤x≤3$, $1≤y≤4$), $Ni_xO_y$ ($1≤x≤2$, $1≤y≤3$), $Fe_xO_y$ ($1≤x≤5$, $1≤y≤5$), $TiO_2$, $MoO_2$, $V_2O_5$ or $Li_4Ti_5O_{12}$; and a carbonaceous material.

According to the fourth embodiment of the present disclosure, there is provided the separator as defined in any one of the first to the third embodiments, wherein the lithium-containing composite particles have a particle diameter of 10 nm to 200 μm.

According to the fifth embodiment of the present disclosure, there is provided the separator as defined in any one of the first to fourth embodiments, wherein the SEI film includes one or more selected from the group consisting of LiF, $Li_2O$, LiOH, and $Li_2CO_3$.

According to the sixth embodiment of the present disclosure, there is provided the separator as defined in any one of the first to the fifth embodiments, wherein the coating layer has a thickness corresponding to 10% to 90% based on 100% of the total thickness of the separator.

According to the seventh embodiment of the present disclosure, there is provided a lithium secondary battery including a positive electrode, a negative electrode and a separator interposed between the positive electrode and negative electrode, wherein the separator is defined in any one of the first to the sixth embodiments and has the coating layer is present at least on a surface of the porous polymer substrate facing the negative electrode.

According to the eighth embodiment of the present disclosure, there is provided a method for manufacturing a lithium secondary battery; including the steps of:

(S1) adding a mixture of a lithium-intercalatable material and lithium metal particles to an electrolyte, and agitating the mixture at room temperature and washing the mixture to obtain a lithium-containing composite particles including lithium ions intercalated into the lithium-intercalatable material and a passivation film on the surface of the lithium-containing composite particles;

(S2) dispersing the lithium-containing composite particles in a solvent with a binder to obtain a slurry, and coating the slurry onto at least one surface of a porous polymer substrate having a plurality of pores, followed by drying, to obtain a separator having a coating layer including the lithium-containing composite particles; and (S3) interposing the separator between a positive electrode and a negative electrode wherein the coating layer of lithium-containing composite particles is present at least on a surface of the porous polymer substrate that faces the negative electrode, wherein the passivation film includes a solid electrolyte interface (SEI) film formed by reaction of lithium ions with the electrolyte.

According to the ninth embodiment of the present disclosure, there is provided the method for manufacturing a lithium secondary battery as defined in the eighth embodiment, wherein the lithium-intercalatable material and lithium metal particles are mixed at a weight ratio of 1:0.05-1:3, in step (S1).

According to the tenth embodiment of the present disclosure, there is provided the method for manufacturing a lithium secondary battery as defined in the eighth or the ninth embodiment, wherein the agitation is carried out at room temperature for 1 hour to 30 hours, in step (S1).

According to the eleventh embodiment of the present disclosure, there is provided the method for manufacturing a lithium secondary battery as defined in the eighth to the tenth embodiment, further including vacuum drying the mixture of lithium-intercalatable material, lithium metal particles and electrolyte to remove the electrolyte remaining on the surface after the lithium-containing composite particles are obtained in step (S1).

According to the twelfth embodiment of the present disclosure, there is provided the method for manufacturing a lithium secondary battery as defined in the eighth to the eleventh embodiment, wherein a conductive material is added to the slurry of step (S2).

According to the thirteenth embodiment of the present disclosure, there is provided the method for manufacturing a lithium secondary battery as defined in the eighth to the twelfth embodiment, wherein the solvent used in step (S2) includes one or more selected from the group consisting of heptane, hexane, pentane, cyclohexane, trichloroethylene, carbon tetrachloride, diisopropyl ether, toluene, methyl t-butyl ether, xylene, benzene, diethyl ether, dichloromethane, 1,2-dichloroethane, butyl acetate, isopropanol, n-butanol, tetrahydrofuran (THF), n-propanol, chloroform, ethyl acetate, 2-butanone, dioxane, and dioxolan.

According to the fourteenth embodiment of the present disclosure, there is provided the method for manufacturing a lithium secondary battery as defined in the eighth to the thirteenth embodiment, wherein the electrolyte includes a lithium salt and an organic solvent.

According to the fifteenth embodiment of the present disclosure, there is provided the method for manufacturing a lithium secondary battery as defined in the eighth to the fourteenth embodiment, wherein the negative electrode includes, as an active material, one or more selected from the group consisting of a Si-based material, Sn-based material, and carbonaceous material.

Advantageous Effects

The separator according to an embodiment of the present disclosure includes a coating layer of lithium-containing composite having a SEI film on the surface facing a negative electrode. Thus, when it is applied to a lithium secondary battery, pre-lithiation is performed so that the lithium ions present in the coating layer of lithium-containing composite of the separator react with an electrolyte during charge, and thus are intercalated to the negative electrode. Therefore, it is possible to supplement the amount of lithium consumed by the formation of a SEI film in the negative electrode. As a result, it is possible to ensure initial reversibility and initial efficiency and to improve the life of a battery.

In addition, the coating layer of lithium-containing composite is formed on the porous polymer substrate not affected by water, which provides an advantage in manufacturing a lithium secondary battery.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Figure 1:
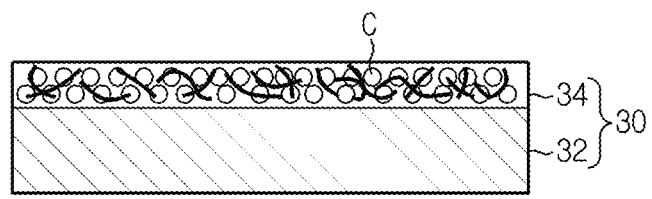
FIG. 1 is a schematic view illustrating the structure of the separator according to an embodiment of the present disclosure.

In one aspect, there is provided a separator for an electrochemical device. According to an embodiment of the present disclosure, the separator includes a porous polymer substrate having a plurality of pores and a coating layer of lithium-containing composite formed on at least one surface thereof. FIG. 1 is a schematic view illustrating the structure of the separator according to an embodiment of the present disclosure.

As shown in FIG. 1, the separator 30 includes: a porous polymer substrate 32; and a coating layer 34 of lithium-containing composite formed on at least one surface of the porous polymer substrate. Herein, the coating layer 34 of lithium-containing composite includes a lithium-containing composite (c). The coating layer 34 of lithium-containing composite may include a plurality of lithium-containing composite particles and a binder positioned on the whole or a part of the surface of the lithium-containing composites to connect the lithium-containing composites with each other and fix them. According to an embodiment of the present disclosure, the lithium-containing composite includes a lithiated compound and a passivation film covering the surface of the lithiated compound. According to an embodiment of the present disclosure, the particle has a core-shell structure which includes a core portion including a lithiated compound and a shell covering the surface of the core as a passivation film.

As described hereinafter, according to an embodiment of the present disclosure, the lithium-containing composite may be obtained by introducing a lithium-intercalatable material and lithium metal to an electrolyte and carrying out reaction. After the reaction, lithium ions are intercalated into the lithium-intercalatable material to form a core portion and a passivation film may be formed on the surface of the core portion. Herein, for example, the lithium-intercalatable material may be prepared in a powder form.

The lithium-intercalatable material is not particularly limited, as long as it allows intercalation of lithium ions to form a lithiated compound. That is, the lithiated compounds comprises lithium. Particular examples of the lithium-intercalatable material include: a metal (metalloid), such as Si, Sn, Al, Sb or Zn, capable of alloying with lithium, or an oxide thereof; a metal oxide capable of storing lithium, such as $Co_xO_y$ (1≤x≤3, 1≤y≤4), $Ni_xO_y$ (1≤x≤2, 1≤y≤3), $Fe_xO_y$ (1≤x≤5, 1≤y≤5), $TiO_2$, $MoO_2$, $V_2O_5$ or $Li_4Ti_5O_{12}$; or a carbonaceous material capable of storing lithium.

Meanwhile, particular examples of the lithiated compound obtained by intercalation of lithium ions into the lithium-intercalatable material include lithium silicide ($Li_xSi$, 0<x<4.4), $Li_xSn$ (0<x<4.4), $Li_xGe$ (0<x<4.4), $Li_xAl$ (0<x<3), $Li_xSb$ (0<x<3), $Li_xZn$ (0<x<1), Co—$Li_2O$, Ni—$Li_2O$, Fe—$Li_2O$, $Li_xC$ (0<x<0.17), $Li_{4+x}Ti_5O_{12}$ (0<x<3), $Li_xMoO_2$ (0<x<4), $Li_xTiO_2$ (0<x<3), $Li_xV_2O_5$ (0<x<5), or a mixture of at least two of them. The lithiated compound may be present in a combination of various types. For example, in the case of lithium silicide ($Li_xSi$, 0<x<4.4), various types may be present in combination, wherein x in $Li_xSi$ is 4.4, 3.75, 3.25, 2.33, or the like.

According to an embodiment of the present disclosure, the passivation film formed on the surface of the lithium-containing composite particles may be a solid electrolyte interface (SEI) film formed by the reaction of lithium ions with an electrolyte. According to an embodiment of the present disclosure, the passivation film may include LiF, $Li_2O$, LiOH, $Li_2CO_3$ or a mixture of at least two of them.

The coating layer, in which lithium-containing composites coated with a SEI film as a passivation film are dispersed homogeneously, is positioned on the surface of the separator facing the negative electrode. During the charge of a lithium secondary battery, since lithium concentration in the lithium-containing composite coating layer is higher than the lithium concentration in the negative electrode, spontaneous reaction occurs so that lithium ions move from the lithium-containing composite coating layer to the negative electrode. In other words, the lithium ions present in the lithium-containing composite coating layer of the separator react with an electrolyte so that they are intercalated into the negative electrode to perform pre-lithiation. Thus, it is possible to supplement the amount of lithium consumed by the formation of the SEI film in the negative electrode during charge, thereby ensuring initial reversibility and initial efficiency and improving life of a battery.

The lithium-containing composite may have a particle size (diameter) of 10 nm to 200 μm, 0.5-100 μm, 1-100 μm, or 5-100 μm. When the above-defined particle size (diameter) is satisfied, it is possible to carry out charge/discharge stably while minimizing side reactions and resistance.

In addition, in the separator according to the present disclosure, the coating layer of lithium-containing composite may have a thickness corresponding to 10-90%, preferably 20-80%, based on 100% of the total thickness of the separator. When the above-defined thickness is satisfied, it is possible to supply lithium in an amount sufficient to carry out pre-lithiation of the negative electrode and to impart stability upon the manufacture of a lithium secondary battery.

In another aspect, there are provided a lithium secondary battery including the above-described separator interposed between a positive electrode and a negative electrode, and a method for manufacturing the same.

In the lithium secondary battery according to the present disclosure, the separator is provided with a coating layer of lithium-containing composite having a passivation film (i.e. solid electrolyte interface (SEI) film) on the surface facing the negative electrode.

Hereinafter, the method for manufacturing a lithium secondary battery according to the present disclosure will be explained with reference to FIGS. 2a to 2c.

Figure 2A:
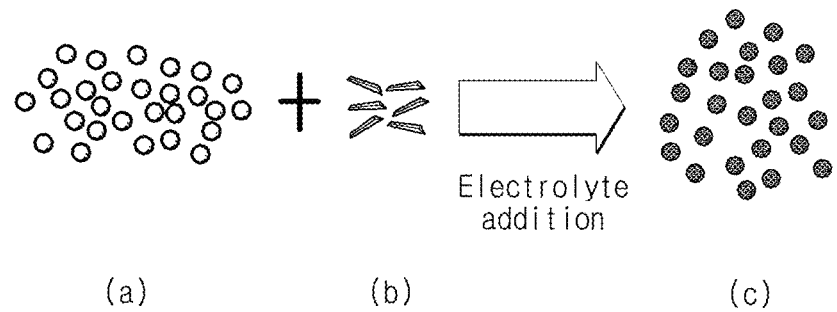
FIGS. 2a to 2c show schematic views illustrating the process for manufacturing a separator and a lithium secondary battery including the same according to an embodiment of the present disclosure.

First, as shown in FIG. 2a, a mixture of a lithium-intercalatable material (a) with lithium metal particles (b) is added to an electrolyte, agitated at room temperature and then washed to obtain lithium-containing composite (c) particles including lithium ions intercalated into the material and having a SEI film on the surface thereof (S1). Herein, the lithium-intercalatable material may be prepared in a powder form.

In step (S1), the lithium-intercalatable material and lithium metal particles may be used at a weight ratio of 1:0.05-1:3, particularly 1:0.07-1:2, more particularly 1:0.1-1:1.5, and even more particularly 1:1. The lithium-intercalatable material is the same as described above and detailed description thereof will be omitted herein.

According to the present disclosure, the agitation may be carried out by using an agitator, such as a stirring bar, at room temperature, for example 10-60° C. While the agitation is carried out at room temperature, the lithium-intercalatable material is in contact with lithium metal continuously. During this, the lithium ions derived from lithium metal are intercalated into the lithium-intercalatable material to perform lithiation, thereby forming a lithiated compound including the material to which lithium is intercalated. Particular examples of the lithiated compound include lithium silicide ($Li_xSi$, 0<x<4.4), $Li_xSn$ (0<x<4.4), $Li_xGe$ (0<x<4.4), $Li_xAl$ (0<x<3), $Li_xSb$ (0<x<3), $Li_xZn$ (0<x<1), $Co-Li_2O$, $Ni-Li_2O$, $Fe-Li_2O$, $Li_xC$ (0<x<0.17), $Li_{4+x}Ti_5O_{12}$ (0<x<3), $Li_xMoO_2$ (0<x<4), $Li_xTiO_2$ (0<x<3), $Li_xV_2O_5$ (0<x<5), or a mixture of at least two of them.

The lithiated compound may be present in a combination of various types. For example, in the case of lithium silicide ($Li_xSi$, 0<x<4.4), various types may be present in combination, wherein x in $Li_xSi$ is 4.4, 3.75, 3.25, 2.33, or the like.

According to an embodiment of the present disclosure, the lithium-containing composite may have a particle size (diameter) of 10 nm to 200 μm, 0.5-100 μm, 1-100 μm, or 5-100 μm, after it is prepared through agitation at room temperature. When the above-defined particle size (diameter) is satisfied, it is possible to carry out charge/discharge stably while minimizing side reactions and resistance.

According to the present disclosure, while the agitation is carried out at room temperature, a passivation film, i.e. a solid electrolyte interface (SEI) film, may be formed on the surface of the lithiated compound through the reaction of lithium with an electrolyte. The SEI film may include LiF, $Li_2O$, LiOH, $Li_2CO_3$ or a mixture of at least two of them.

The agitation may be carried out within a time during which the lithium-intercalatable material is sufficiently in contact with lithium metal particles in the electrolyte, and may be controlled depending on the sizes (diameters) of the two types of particles. For example, the agitation may be carried out for 1-30 hours, preferably 1-24 hours, and more preferably 3-24 hours.

Meanwhile, the electrolyte includes a lithium salt as an electrolyte salt and an organic solvent for dissolving the lithium salt.

Any lithium salt used conventionally for an electrolyte for a lithium secondary battery may be used without particular limitation. For example, the anion of the lithium salt may be any one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, and combinations thereof.

The organic solvent used for the electrolyte may be any organic solvent used conventionally without particular limitation. Typical examples of the organic solvent include any one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulforan, gamma-butyrolactone, propylene sulfite, tetrahydrofuran, or a mixture of at least two of them.

In addition, after the lithium-containing composite is obtained, vacuum drying may be further carried out to remove the electrolyte remaining on the surface.

Figure 2B:
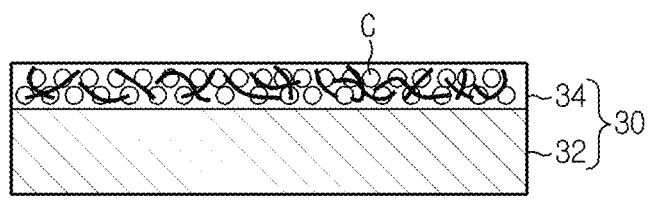

Then, as shown in FIG. 2b, the lithium-containing composite lithiated in the electrolyte through agitation at room temperature and having a SEI film on the surface thereof is dispersed in a solvent together with a binder to obtain slurry. In addition, the slurry is coated and dried on at least one surface of a porous polymer substrate 32 to obtain a separator 30 having a coating layer 34 of lithium-containing composite (c) (S2).

The porous polymer substrate used for manufacturing the separator may be a porous polymer film made of a polyolefinic polymer, such as ethylene homopolymer, propylene homopolymer, ethylene-butene copolymer, ethylene/hexene copolymer or ethylene/methacrylate copolymer. Such porous polymer films may be used alone or in the form of a laminate. In addition, an insulating thin film having high ion permeability and mechanical strength may be used. The separator may include a safety reinforced separator (SRS) including a ceramic material coated on the surface of the separator to a small thickness. In addition, a conventional porous non-woven web, such as non-woven web made of high-melting point glass fibers or polyethylene terephthalate fibers, may be used, but the scope of the present disclosure is not limited thereto.

The porous polymer substrate is not affected by water. Thus, it is possible to apply slurry of lithium-containing composite directly onto the porous polymer substrate to form a coating layer with no need for carrying out drying.

The solvent may be an organic solvent having a polarity of 5.0 or less. When the lithium-containing composite obtained from step (S1) is in contact with water, lithium may be oxidized and released, thereby making it difficult to carry out desired pre-lithiation. Therefore, in order to carry out pre-lithiation of a negative electrode efficiently, it is preferred to use an organic solvent having a polarity of 5.0 or less, when preparing slurry of lithium-containing composite. Particular examples of the organic solvent having a polarity of 5.0 or less include heptane, hexane, pentane, cyclohexane, trichloroethylene, carbon tetrachloride, diisopropyl ether, toluene, methyl t-butyl ether, xylene, benzene, diethyl ether, dichloromethane, 1,2-dichloroethane, butyl acetate, isopropanol, n-butanol, tetrahydrofuran (THF), n-propanol, chloroform, ethyl acetate, 2-butanone, dioxane, dioxolan, or a mixture of at least two of them. The organic solvent having a polarity of 5.0 or less may be used in such an amount that the slurry may retain suitable viscosity.

The binder is an ingredient which assists binding of the lithium-containing composites and binding between the coating layer and the separator upon the formation of a coating layer. Any conventional binder used for manufacturing an electrode may be used.

If desired, the slurry may further include a conductive material to impart conductivity to the coating layer.

There is no particular limitation in the coating process, as long as it is a method used currently in the art. For example, a coating process using a slot die may be used, or a Mayer bar coating process, gravure coating process, dip coating process, spray coating process, etc. may be used. Such coating processes may be carried out under a milder condition as compared to chemical vapor deposition (CVD) or physical vapor deposition (PVD), thereby providing improved processability. For example, in the case of a coating process through deposition, it requires a vacuum state and high electric current but shows a significant limitation of low coating yield. On the other hand, the coating process using slurry allows coating with high yield with no need for a special system.

In the thus formed coating layer, the lithium-containing composite having a SEI film on the surface thereof are dispersed. In addition, the coating layer is positioned on the surface facing the negative electrode. Therefore, since lithium concentration in the lithium-containing composite coating layer is higher than the lithium concentration in the negative electrode during the charge of a lithium secondary battery, spontaneous reaction occurs so that lithium ions move from the lithium-containing composite coating layer to the negative electrode. In other words, the lithium ions present in the lithium-containing composite coating layer of the separator react with an electrolyte so that they are intercalated into the negative electrode to perform pre-lithiation. Thus, it is possible to supplement the amount of lithium consumed by the formation of the SEI film in the negative electrode during charge, thereby ensuring initial reversibility and initial efficiency and improving life of a battery.

In addition, since the coating layer of lithium-containing composite is formed on the porous polymer substrate not affected by water, it is possible to provide improved processability during the manufacture of a lithium secondary battery. For example, when the coating layer of lithium-containing composite is formed on a negative electrode active material layer for the purpose of pre-lithiation of the negative electrode, it is inconvenient that the coating layer is formed after completely drying the negative electrode active material layer, since the negative electrode active material layer may include an aqueous binder. However, in the case of a porous polymer substrate used conventionally for a separator, it is not affected by water. Thus, it is possible to form a coating layer directly on such a porous polymer substrate without a need for a drying step.

According to the present disclosure, the coating layer of lithium-containing composite may have a thickness corresponding to 10-90%, preferably 20-80%, based on 100% of the total thickness of the separator. When the above-defined thickness is satisfied, it is possible to supply lithium in an amount sufficient to carry out pre-lithiation of the negative electrode and to impart stability upon the manufacture of a lithium secondary battery.

Figure 2C:
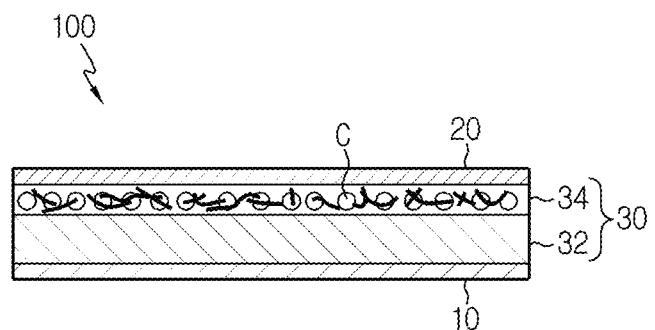

Then, as shown in FIG. 2c, the separator 30 obtained as described above is interposed between a positive electrode 10 and a negative electrode 20 to form an electrode assembly, thereby providing a lithium secondary battery 100 (S3).

The positive electrode may be obtained by mixing a positive electrode active material, conductive material, binder and a solvent to form slurry and coating the slurry directly onto a metal current collector, or casting the slurry onto a separate support, peeling a positive electrode active material film from the support and laminating the film on a metal current collector.

The positive electrode active material used in the positive electrode active material layer may be any one selected from the group consisting of $LiCoO_2$, $LiNiO_2$, $LiMn_2O_4$, $LiCoPO_4$, $LiFePO_4$, $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic ratio of an element forming oxide, and $0 \leq x < 0.5$, $0 \leq y < 0.5$, $0 \leq z < 0.5$, and $0 < x+y+z \leq 1$), and combinations thereof.

The binder is an ingredient which assists binding between the active material and the conductive material and binding to the current collector. In general, the binder is added in an amount of 1-20 wt % based on the total weight of the electrode mixture. Particular examples of the binder include polyvinylidene fluoride-co-hexafluoropropylene (PVDF-co-HFP), polyvinylidene fluoride (PVDF), polyacrylonitrile, polymethyl methacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylic acid, styrene butadiene rubber (SBR), or the like. Carboxymethyl cellulose (CMC) may also be used as a thickening agent for controlling the viscosity of slurry.

The conductive material is not particularly limited, as long as it has conductivity while not causing any chemical change in the corresponding battery. Particular examples of the conductive material include: carbon black, such as carbon black, acetylene black, Ketjen black, channel black, furnace black, lamp black or thermal black; conductive fibers, such as carbon fibers or metallic fibers; metal powder, such as fluorocarbon, aluminum or nickel powder; conductive whisker, such as zinc oxide or potassium titanate; conductive metal oxide, such as titanium oxide; and conductive materials, such as polyphenylene derivatives. The conductive material may be added in an amount of 0.1-20 wt % based on the total weight of the electrode slurry composition.

The solvent may be N-methyl pyrrolidone, acetone, water, or the like.

The current collector is not particularly limited, as long as it has high conductivity while not causing any chemical change in the corresponding battery. Particular examples of the current collector include stainless steel, aluminum, nickel, titanium, baked carbon, copper or stainless steel surface-treated with carbon, nickel, titanium, silver, or the like, or the like. In addition, fine surface irregularities may be formed on the surface of the current collector to increase the adhesion of the positive electrode active material layer. The current collector may have various shapes, such as a film, sheet, foil, net, porous body, foam, non-woven body, or the like. The current collector may have a thickness of 3-500 μm, but is not limited thereto.

There is no particular limitation in the coating process of the electrode slurry, as long as it is a method used currently in the art. For example, a coating process using a slot die may be used, or a Mayer bar coating process, gravure coating process, dip coating process, spray coating process, etc. may be used.

The negative electrode includes a negative electrode current collector and a negative electrode active material layer formed on the negative electrode current collector.

The negative electrode current collector is not particularly limited, as long as it has high conductivity while not causing any chemical change in the corresponding battery. Particular examples of the negative electrode current collector may include copper, stainless steel, aluminum, nickel, titanium, baked carbon, copper or stainless steel surface-treated with carbon, nickel, titanium or silver, aluminum-cadmium alloy, or the like. In addition, the negative electrode current collector may have various shapes, such as a film, sheet, foil, net, porous body, foam and a non-woven web body. The negative electrode current collector may have a thickness of 3-500 μm. In addition, it is possible to form fine surface irregularities on the surface of the current collector in order to increase the adhesion of a negative electrode active material layer.

The negative electrode active material layer may be formed by applying slurry prepared by dissolving and dispersing a negative electrode active material, binder and a conductive material in a solvent, followed by drying and pressing.

The negative electrode active material may include a Si-based material, Sn-based material, carbonaceous material or a mixture of at least two of them.

In this case, the carbonaceous material may be at least one selected from the group consisting of crystalline artificial graphite, crystalline natural graphite, amorphous hard carbon, low crystalline soft carbon, carbon black, acetylene black, Ketjen black, Super P, graphene and fibrous carbon. Preferably, the carbonaceous material may be crystalline artificial graphite and/or crystalline natural graphite. The Si-based material may include Si, SiO, $SiO_2$, or the like, and the Sn-based material may include Sn, SnO, $SnO_2$, or the like.

In addition to the above-mentioned materials, the negative electrode active material may include: metal composite oxides, such as $Li_xFe_2O_3$ (0≤x≤1), $Li_xWO_2$ (0≤x≤1), $Sn_xMe_{1-x}Me'_yO_z$ (Me: Mn, Fe, Pb, Ge; Me': Al, B, P, Si, elements of Group 1, 2 or 3 in the Periodic Table, halogen; 0≤x≤1; 1≤y≤3; 1≤z≤8); lithium metal; lithium alloy; silicon-based alloy; tin-based alloy; metal oxides, such as PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; titanium oxide; lithium titanium oxide; or the like.

Meanwhile, the conductive material, binder and the solvent may be the same as used for manufacturing the positive electrode.

The lithium secondary battery according to an embodiment of the present disclosure may be obtained by interposing the separator between the positive electrode and the negative electrode to form an electrode assembly, introducing the electrode assembly to a pouch, cylindrical battery casing or a prismatic battery casing, and then injecting the electrolyte thereto to finish a secondary battery. Otherwise, the lithium secondary battery may be obtained by stacking the electrode assemblies, impregnating the stack with the electrolyte, and introducing the resultant product to a battery casing, followed by sealing.

The electrolyte may be the same as the electrode used for preparing the lithium-containing composite.

Optionally, the electrolyte may further include additives, such as an overcharge-preventing agent, used for the conventional electrolyte.

According to an embodiment of the present disclosure, the lithium secondary battery may be a stacked, wound, stacked and folded or a cable type battery.

The lithium secondary battery according to the present disclosure may be used for a battery cell used as a power source for a compact device, and may be used preferably as a unit battery for a medium- or large-size battery module including a plurality of battery cells. Particular examples of such medium- or large-size batteries include electric vehicles, hybrid electric vehicles, plug-in hybrid electric vehicles, power storage systems, or the like. Particularly, the lithium secondary battery may be useful for batteries for hybrid electric vehicles and new & renewable energy storage batteries, requiring high output.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

<Manufacture of Separator>

Step 1: Preparation of Lithium-Containing Composite

Silicon powder and lithium metal pieces were introduced to a beaker at a weight ratio of 1:1, an electrolyte was added thereto to a solid content of 40%, and then the resultant mixture was agitated through a stirring bar at room temperature (25° C.). Herein, the electrolyte includes 1M $LiPF_6$ dissolved in a mixed solvent containing ethylene carbonate (EC) and ethyl methyl carbonate (EMC) at a volume ratio of 50:50.

During the agitation, lithium silicide ($Li_xSi$, 0<x<4.4) was formed through the intercalation of lithium ions into silicon powder, while lithium metal was in contact with silicon powder continuously. Herein, a solid electrolyte interface (SEI) film was formed on the surface of lithium silicide through the reaction of lithium ions with the electrolyte. Herein, lithium silicide ($Li_xSi$) is a combination of various types wherein x is 4.4, 3.75, 3.25, 2.33, or the like.

After completing the agitation, the lithium silicide powder having a SEI film thereon was washed with dimethyl chloride (DMC) to remove the solute and the remaining unreacted lithium metal from the electrolyte. Then, vacuum drying was carried out at 50° C. for 5 hours to remove the solvent, thereby providing lithium silicide powder having a SEI film thereon.

Step 2: Manufacture of Separator Including Coating Layer of Lithium-Containing Composite The lithium silicide powder having a SEI film thereon and obtained as described above, carbon black (Denka black) as a conductive material and polyvinylidene fluoride (PVDF) as a binder were added to tetrahydrofuran (THF) as a solvent at a weight ratio of 8:1:1, followed by mixing. The resultant slurry was applied uniformly to one surface of a polyethylene porous film (thickness: 15 μm), followed by drying, to obtain a separator provided with a surface coating layer (thickness: 10 μm) including the lithium silicide powder having a SEI film thereon.

<Manufacture of Positive Electrode>

First, 95 wt % of $LiCoO_2$ as a positive electrode active material, 2.5 wt % of carbon black (Denka black, conductive material) and 2.5 wt % of PVDF (binder) were added to N-methyl-2-pyrrolidone (NMP) as a solvent to obtain positive electrode slurry. Then, the slurry was coated on one surface of an aluminum current collector, followed by drying and pressing, to form a positive electrode active material layer and to obtain a positive electrode.

<Manufacture of Negative Electrode>

First, 92 wt % of a mixture containing graphite with SiO at a weight ratio of 7:3 (negative electrode active material), 3 wt % of carbon black (Denka black, conductive material, 3.5 wt % of styrene butadiene rubber (SBR, binder) and 1.5 wt % of carboxymethyl cellulose (CMC, thickening agent) were added to water as a solvent to obtain negative electrode slurry. Then, the slurry was coated on one surface of a copper current collector, followed by drying and pressing, to form a negative electrode active material layer and to obtain a negative electrode.

<Manufacture of Lithium Secondary Battery>

The separator was interposed between the positive electrode and the negative electrode in such a manner that the surface coating layer including lithium silicide having a SEI film thereon might face the negative electrode, thereby providing an electrode assembly. Then, an electrolyte including 1M $LiPF_6$ dissolved in a mixed solvent containing ethylene carbonate (EC) and ethyl methyl carbonate (EMC) at a volume ratio of 50:50 was injected thereto to provide a coin-type bi-cell.

Example 2

A coin-type bi-cell was obtained in the same manner as Example 1, except that the lithium-containing composite slurry was prepared by using 1,3-dioxolane as a solvent in Step 2 (step of forming a coating layer of lithium-containing composite) in manufacturing a separator.

Comparative Example 1

<Manufacture of Separator>
Step 1: Preparation of Lithiated Compound
Silicon powder was mixed with lithium metal pieces at a weight ratio of 1:1 and the resultant mixture was heat treated at a temperature of 200° C. for 6 hours, while agitation was carried out under argon atmosphere. During this, lithium metal was molten and was in contact with silicon powder. In addition, alloying of silicon powder with lithium metal was carried out due to such a high temperature, thereby forming lithium silicide ($Li_xSi$, 0<x<4.4).

Step 2: Manufacture of Separator Including Coating Layer

The lithium silicide powder obtained from Step 1, carbon black (Denka black) as a conductive material and PVDF as a binder were added to tetrahydrofuran (THF) as a solvent at a weight ratio of 8:1:1, followed by mixing. The resultant slurry was applied uniformly to one surface of a polyethylene porous film (thickness: 15 μm), followed by drying, to obtain a separator provided with a surface coating layer (thickness: 10 μm) including the lithium silicide powder having a SEI film thereon.

Meanwhile, the same procedure as Example 1 was carried out to obtain a positive electrode, negative electrode and a coin-type bi-cell.

Comparative Example 2

<Manufacture of Separator>
Lithium metal was deposited on one surface of a polyethylene porous film through a sputtering process to obtain a separator having a coating layer formed thereon to an average thickness of 5 μm.

Meanwhile, the same procedure as Example 1 was carried out to obtain a positive electrode, negative electrode and a coin-type bi-cell.

Comparative Example 3

A coin-type bi-cell was obtained in the same manner as Example 1, except that a polyethylene porous film was used as a separator.

Test Example 1: Comparison of Coating Layers of Separators

To compare the coating layer of the separator according to Example 1 with the coating layer of the separator according to Comparative Example 1, the surface states of the lithium-containing composite (Example 1) and the lithiated compound (Comparative Example 1), obtained from Step 1, were observed by scanning electron microscopy (SEM). The results are shown in FIGS. 3 and 4.

Figure 3:
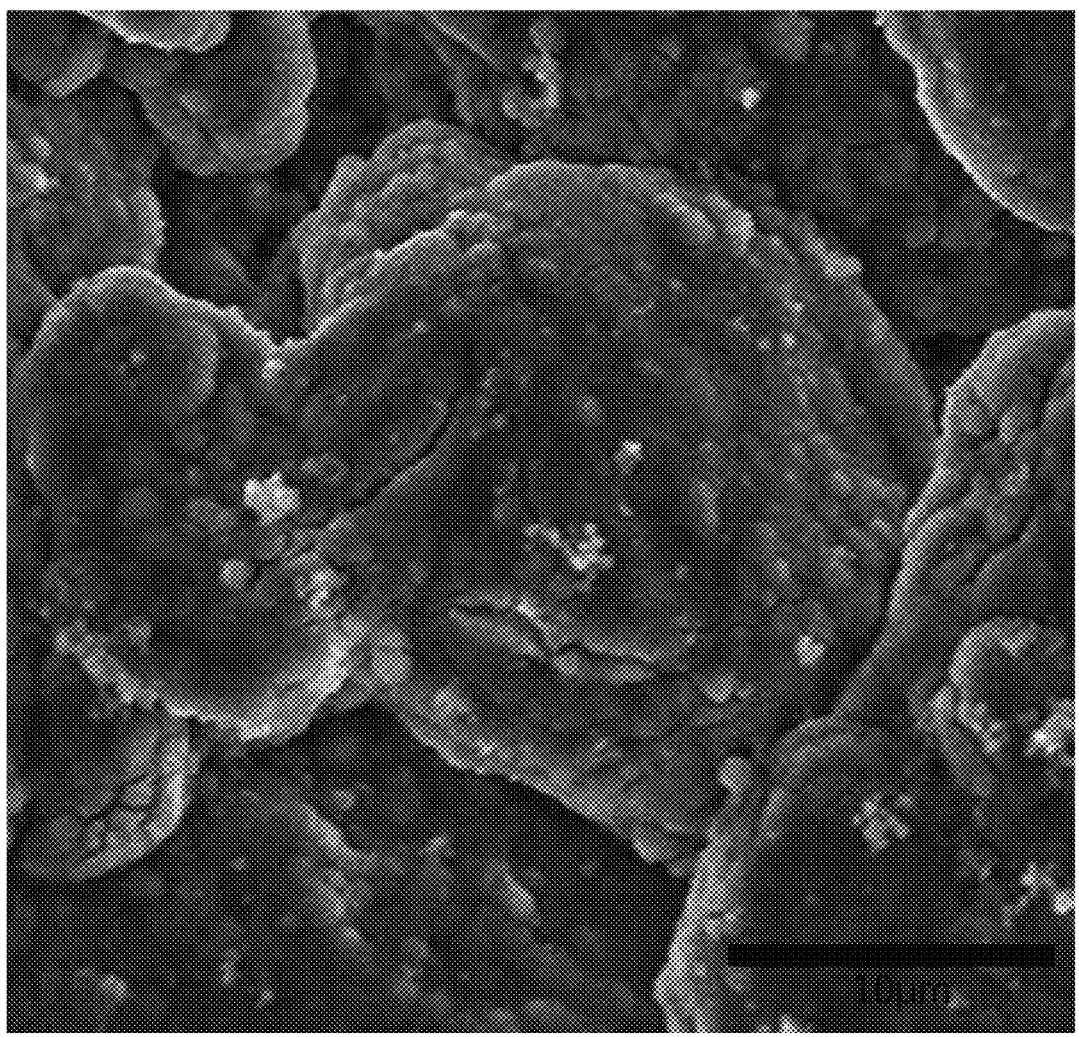
FIGS. 3 and 4 show scanning electron microscopic (SEM) images illustrating the surface state of a lithium-containing composite obtained during the manufacture of a separator according to Example 1 and Comparative Example 1, respectively.

As can be seen from FIG. 3, lithium silicide obtained from Step 1 of Example 1 for the purpose of forming a coating layer of the separator has a solid electrolyte interface (SEI) film (stable polymer coating film) on the surface thereof through the lithiation step using agitation at room temperature.

Figure 4:
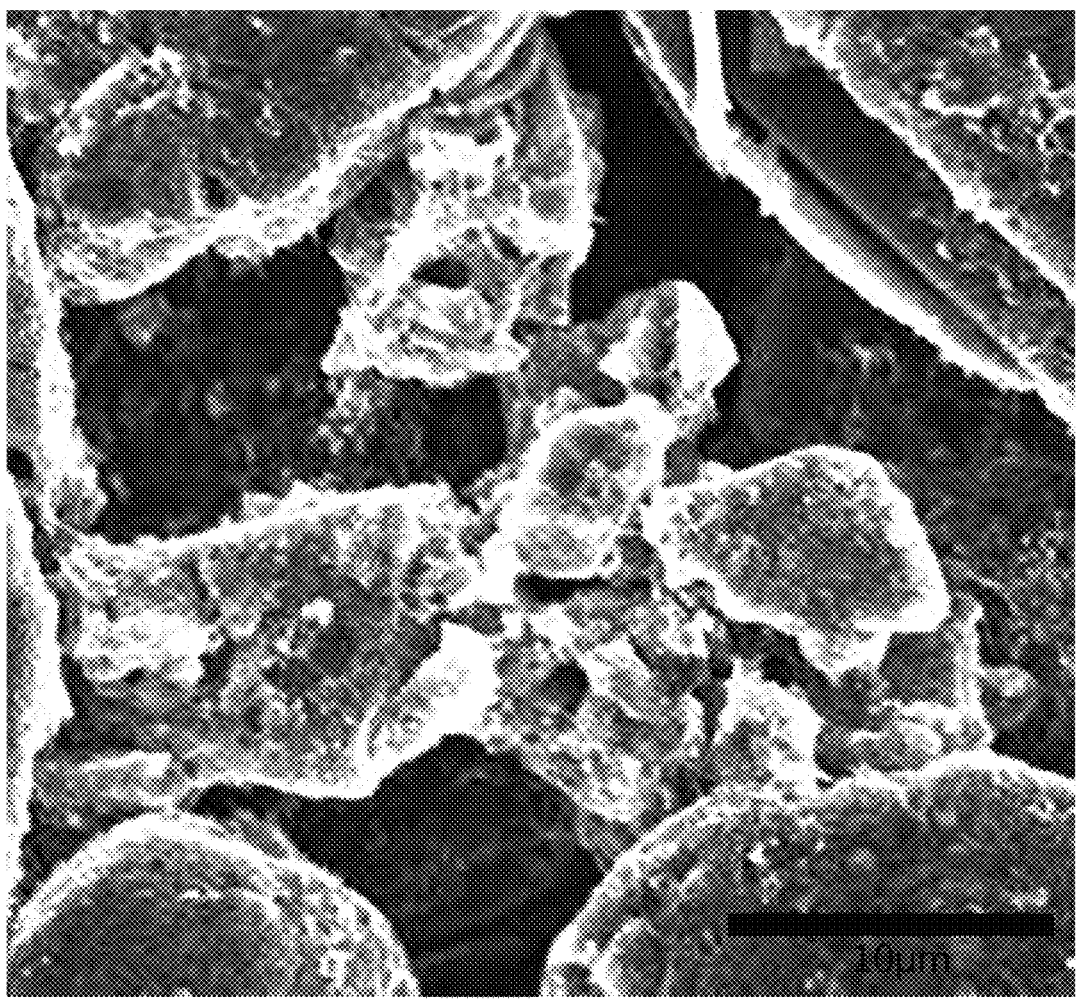

On the contrary, as can be seen from FIG. 4, lithium silicide obtained from Step 1 of Comparative Example 1 is subjected to lithiation based on high-temperature heat treatment, and thus causes cracking of particles due to exposure to high temperature and rapid reaction and has no SEI on the surface thereof.

Test Example 2: Initial Reversibility Test

Each of the negative electrodes and separators according to Examples 1 and 2 and Comparative Examples 1-3 was used and lithium metal foil was used as a counter electrode for the negative electrode to obtain an electrode assembly. Then, an electrolyte including 1M $LiPF_6$ dissolved in a mixed solvent containing ethylene carbonate (EC) and ethyl methyl carbonate (EMC) at a volume ratio of 50:50 was injected thereto to provide a coin-type half-cell.

The half-cell was charged/discharged by using an electrochemical charger. Herein, charge was carried out by applying electric current at a current density of 0.1 C-rate to a voltage of 0.005V (vs. Li/Li$^+$), and discharge was carried out at the same current density to a voltage of 1.5V. The ratio of initial discharge capacity to initial charge capacity was calculated for each cell to obtain initial efficiency. The results are shown in the following Table 1.

Test Example 3: Capacity Maintenance Test

Each of the bi-cells according to Examples 1 and 2 and Comparative Examples 1-3 was used.

Each bi-cell was charged/discharged by using an electrochemical charger. Herein, charge was carried out by applying electric current at a current density of 0.1 C-rate to a voltage of 4.2V (vs. Li/Li$^+$), and discharge was carried out at the same current density to a voltage of 2.5V. Such charge/discharge cycles were repeated 100 times and the ratio of discharge capacity at the 100$^{th}$ cycle to discharge capacity at the first cycle was calculated to obtain capacity maintenance. The results are shown in the following Table 1.

TABLE 1

| | Ex. 1 | Ex. 2 | Comp. Ex. 1 | Comp. Ex. 2 | Comp. Ex. 3 |
|---|---|---|---|---|---|
| Initial efficiency (%) | 104 | 103 | 98 | 95 | 80 |
| Capacity maintenance (%) | 92 | 91 | 84 | 81 | 65 |

As can be seen from Table 1, the cells using a separator having a lithium silicide surface coating layer according to Examples 1 and 2 and Comparative Examples 1 and 2 show improved initial efficiency and capacity maintenance, as compared to Comparative Example 3 having no surface coating layer. It is thought that the above results are derived from spontaneous pre-lithiation in which the lithium ions present in the lithium silicide surface coating layer of the separator are intercalated to the negative electrode through reduction, when the electrolyte is injected to manufacture each cell.

Particularly, Examples 1 and 2 show higher initial efficiency and capacity maintenance as compared to Comparative Example 1. It is thought that since lithium silicide used for surface coating of the separator according to Comparative Example 1 undergoes lithiation based on high-temperature heat treatment, cracking occurs due to exposure to high temperature and rapid reaction and lithium ions in the surface coating layer cannot be realized sufficiently. On the contrary, since lithium silicide used for surface coating of the separators according to Examples 1 and 2 is not subjected to high-temperature heat treatment but undergoes pre-lithiation through agitation at room temperature. Thus, a SEI film (stable polymer coating film) is formed on the surface of lithium silicide without cracking of particles. By virtue of the SEI film, it is possible to carry out pre-lithiation of the negative electrode more stably without consumption of lithium, when injecting the electrolyte after the assemblage of the cells. In addition, lithium silicide surrounded with such stable SEI can retain its structure even after repeated charge/discharge cycles. Therefore, it is possible to improve not only efficiency but also capacity maintenance.

Meanwhile, in the case of Comparative Example 2, lithium metal loaded by deposition has high reactivity even with a small amount of water. Thus, oxidation occurs well during the assemblage of the cell to cause high consumption of lithium, which makes it difficult to carry out stable pre-lithiation of the negative electrode. In addition, the remaining lithium metal not used for pre-lithiation causes side reactions with the electrolyte during repeated charge/discharge cycles. Therefore, it is not possible to improve efficiency and capacity maintenance sufficiently.

What is claimed is:

1. A separator comprising:
   a porous polymer substrate having a plurality of pores; and
   a coating layer formed on at least one surface of the porous polymer substrate,
   wherein the coating layer comprises a plurality of lithium-containing composite particles and a binder positioned on a whole or a part of a surface of the lithium-containing composite particles to connect and fix the lithium-containing composite particles with each other,
   wherein the lithium-containing composite particles consist of a lithiated compound and a passivation film formed on a surface of the lithiated compound, and the passivation film comprises a solid electrolyte interface (SEI),
   wherein the SEI film comprises one or more selected from the group consisting of LiF, LiOH, and $Li_2CO_3$,
   wherein the lithiated compound comprises lithium silicide ($Li_xSi$, $0<x<4.4$), and one or more selected from the group consisting of $Li_xSn$ ($0<x<4.4$), $Li_xGe$ ($0<x<4.4$), $Li_xAl$ ($0<x<3$), $Li_xSb$ ($0<x<3$), $Li_xZn$ ($0<x<1$), Co—$Li_2O$, Ni—$Li_2O$, Fe—$Li_2O$, $Li_xC$ ($0<x<0.17$), $Li_{4+x}Ti_5O_{12}$ ($0<x<3$), $Li_xMoO_2$ ($0<x<4$), $Li_xTiO_2$ ($0<x<3$), $Li_xV_2O_5$ ($0<x<5$).

2. The separator according to claim 1, wherein the lithiated compound is obtained by intercalation of lithium ions in a lithium-intercalatable material, and the lithium-intercalatable material comprises one or more selected from the group consisting of:
   one or more metal or metal oxide of Si, Sn, Al, Sb or Zn;
   one or more metal oxide of $Co_xO_y$ ($1≤x≤3$, $1≤y≤4$), $Ni_xO_y$ ($1≤x≤2$, $1≤y≤3$), $Fe_xO_y$ ($1≤x≤5$, $1≤y≤5$), $TiO_2$, $MoO_2$, $V_2O_5$ or $Li_4Ti_5O_{12}$; and
   a carbonaceous material.

3. The separator according to claim 1, wherein the lithium-containing composite particles have a particle diameter of 10 nm to 200 μm.

4. The separator according to claim 1, wherein the coating layer has a thickness corresponding to 10% to 90% based on 100% of a total thickness of the separator.

5. A lithium secondary battery comprising a positive electrode, a negative electrode and the separator according to claim 1 interposed between the positive electrode and negative electrode, wherein the coating layer is present at least on a surface of the porous polymer substrate facing the negative electrode.

6. The separator according to claim 1, wherein the coating layer further comprises a conductive material.

7. The separator according to claim 1, wherein the binder comprises at least one of polyvinylidene fluoride-co-hexafluoropropylene (PVDF-co-HFP), polyvinylidene fluoride (PVDF), polyacrylonitrile, polymethyl methacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylic acid, or styrene butadiene rubber (SBR).

8. A method for manufacturing a lithium secondary battery, comprising the steps of:
   (S1) adding a mixture of a lithium-intercalatable material and lithium metal particles to an electrolyte, and agitating the mixture at room temperature and washing the mixture to obtain lithium-containing composite particles comprising lithium ions intercalated into the lithium-intercalatable material and a passivation film on a surface of the lithium-containing composite particles;
   (S2) dispersing the lithium-containing composite particles in a solvent with a binder to obtain a slurry, and coating the slurry onto at least one surface of a porous polymer substrate having a plurality of pores, followed by drying, to obtain a separator having a coating layer comprising the lithium-containing composite particles; and
   (S3) interposing the separator between a positive electrode and a negative electrode wherein the coating layer of lithium-containing composite particles is present at least on a surface of the porous polymer substrate that faces the negative electrode,
   wherein the passivation film comprises a solid electrolyte interface (SEI) film formed by a reaction of lithium ions with the electrolyte.

9. The method for manufacturing the lithium secondary battery according to claim 8, wherein the lithium-intercalatable material and lithium metal particles are mixed at a weight ratio of 1:0.05-1:3, in step (S1).

10. The method for manufacturing the lithium secondary battery according to claim 8, wherein the agitation is carried out at room temperature for 1 hour to 30 hours, in step (S1).

11. The method for manufacturing a lithium secondary battery according to claim 8, further comprising vacuum drying the mixture of lithium-intercalatable material, lithium metal particles and electrolyte to remove the electrolyte remaining on the surface after the lithium-containing composite particles are obtained in step (S1).

12. The method for manufacturing the lithium secondary battery according to claim 8, wherein a conductive material is added to the slurry of step (S2).

13. The method for manufacturing the lithium secondary battery according to claim 8, wherein the solvent used in step (S2) comprises one or more selected from the group consisting of heptane, hexane, pentane, cyclohexane, trichloroethylene, carbon tetrachloride, diisopropyl ether, toluene, methyl t-butyl ether, xylene, benzene, diethyl ether, dichloromethane, 1,2-dichloroethane, butyl acetate, isopropanol, n-butanol, tetrahydrofuran (THF), n-propanol, chloroform, ethyl acetate, 2-butanone, dioxane, and dioxolan.

14. The method for manufacturing the lithium secondary battery according to claim 8, wherein the electrolyte comprises a lithium salt and an organic solvent.

15. The method for manufacturing the lithium secondary battery according to claim 8, wherein the negative electrode comprises, as an active material, one or more selected from the group consisting of a Si-based material, Sn-based material, and carbonaceous material.

* * * * *